Figure 1:
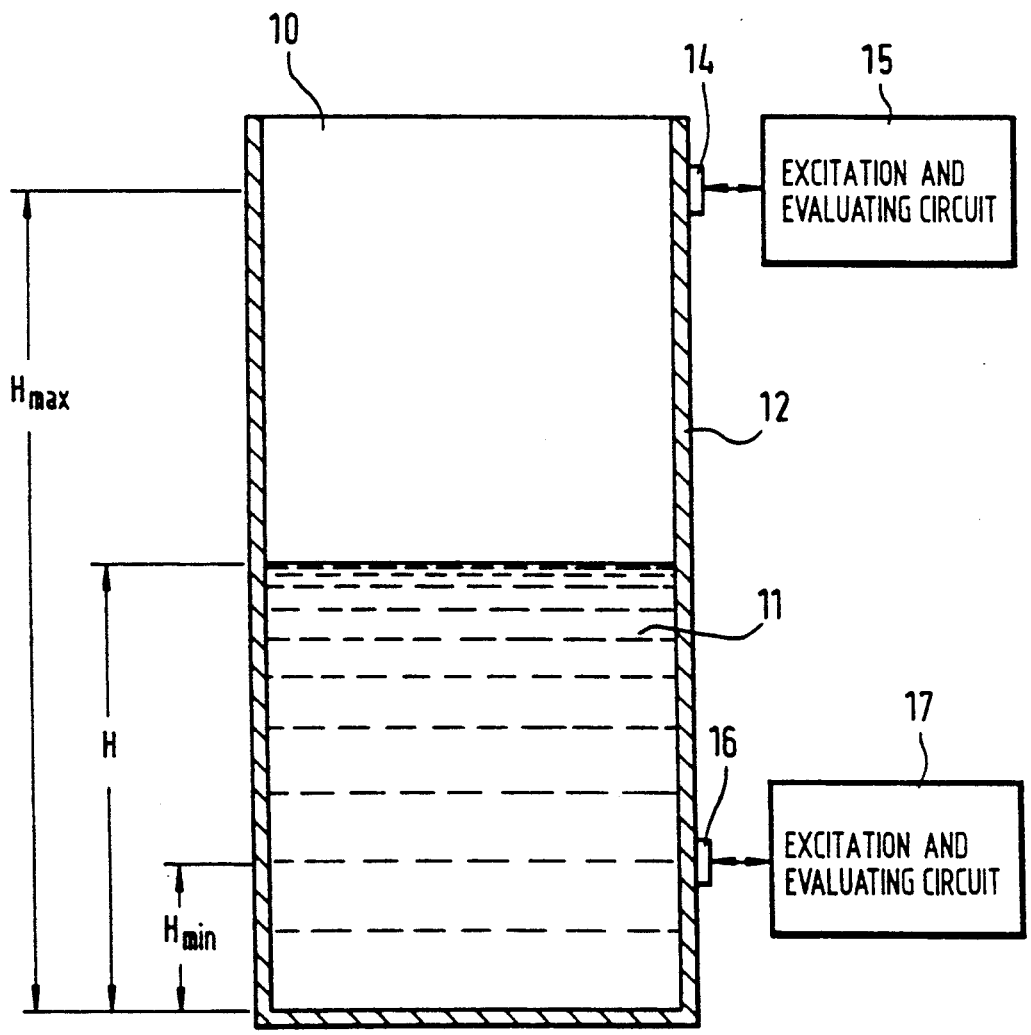

United States Patent [19]
Pfeiffer

[11] Patent Number: 5,264,831
[45] Date of Patent: Nov. 23, 1993

[54] DEVICE FOR DETERMINING AND/OR MONITORING A PREDETERMINED CONTENTS LEVEL IN A CONTAINER

[75] Inventor: Helmut Pfeiffer, Steinnen, Fed. Rep. of Germany

[73] Assignee: Endress u. Hauser GmbH u. Co., Fed. Rep. of Germany

[21] Appl. No.: 667,498

[22] Filed: Mar. 11, 1991

[30] Foreign Application Priority Data

Mar. 14, 1990 [DE] Fed. Rep. of Germany ....... 4008135

[51] Int. Cl.⁵ ............................................. G08B 21/00
[52] U.S. Cl. ..................................... 340/621; 340/618; 73/290 V; 310/323; 310/328
[58] Field of Search ........................ 340/618, 621, 620; 73/290 V; 367/908; 310/317, 321, 323, 328, 331

[56] References Cited

U.S. PATENT DOCUMENTS

| 2,990,543 | 6/1961 | Rod | 73/290 V |
| 4,107,994 | 8/1978 | Sogo | 340/615 X |
| 4,242,744 | 12/1980 | Rottmar | 367/173 |
| 4,320,659 | 3/1982 | Lynnworth et al. | 73/290 V |
| 4,570,482 | 2/1986 | Murata et al. | 73/290 V |
| 4,594,584 | 6/1986 | Pfeiffer et al. | 340/620 |

FOREIGN PATENT DOCUMENTS

| 2632297 | 1/1977 | Fed. Rep. of Germany . |
| 2743394 | 3/1979 | Fed. Rep. of Germany . |
| 3314224 | 12/1983 | Fed. Rep. of Germany . |
| 3336991 | 5/1985 | Fed. Rep. of Germany . |
| 1531729 | 11/1978 | United Kingdom . |
| 2146770 | 4/1985 | United Kingdom . |

*Primary Examiner*—Jeffrey Hofsass
*Attorney, Agent, or Firm*—Barnes & Thornburg

[57] ABSTRACT

To determine and/or monitor a predetermined contents level in a container, at the height of the level to be monitored a region of the container wall is defined by a ring or frame which is attached to the outer side of the container wall in such a manner that it is in oscillatory mechanical connection with said container wall. The region of the container wall enclosed by the ring or frame forms the diaphragm of a sensor which also comprises an electromechanical excitation transducer which when fed with an electrical voltage sets the defined diaphragm region into oscillations, and an electromechanical receiving transducer which converts the oscillations of the defined diaphragm region to an electrical AC voltage. An evaluating circuit connected to the receiving transducer serves to initiate display and/or switching operations in dependence upon the frequency, the phase or the amplitude of the AC voltage emitted by the receiving transducer.

43 Claims, 8 Drawing Sheets

DEVICE FOR DETERMINING AND/OR MONITORING A PREDETERMINED CONTENTS LEVEL IN A CONTAINER

The invention relates to a device for determining and/or monitoring a predetermined contents level in a container comprising a sensor which is mounted at the height of the predetermined level and comprises a diaphragm which comes into contact with the filling material when the latter reaches or exceeds the predetermined level in the container, and an electromechanical excitation transducer which when fed with an electrical voltage sets the diaphragm in oscillations, and an electromechanical receiving transducer which converts the oscillations of the diaphragm into an electrical AC voltage, and an evaluating circuit for initiating display and/or switching operations in dependence upon the frequency, the phase or the amplitude of the AC voltage emitted by the receiving transducer.

Devices of this type are known from GB-A 1,531,729 and DE-A 2,632,297. In these known devices, at the point of the container at which the sensor is mounted an opening is formed in the container wall and in said opening the sensor diaphragm, which has a smaller thickness than the container wall is mounted in such a manner that it is contacted by the filling material in the container when the level reaches or exceeds the height of the sensor. These known solutions cause several problems. Frequently, it is undesirable, or for example in the case of explosive contents even unallowed, to break through the container wall. Furthermore, after installation of the sensor the opening must be sealed again in pressure-tight manner. In particular, it is difficult to mount a sensor subsequently on a container which already exists and is in operation because to break through the container wall the container must be emptied. Finally, such a breaking through of the container wall involves increased cleaning expenditure in the case of containers containing foodstuffs, due to the strict hygiene requirements.

DE- A 2,743,394 also already discloses the mounting of a level sensor at the height of the predetermined level on the outer side of the container without an opening being required in the container wall. However, in this case the sensor is not a diaphragm sensor but a sonic or ultrasonic echo sounding sensor which sends sonic or ultrasonic pulses through the container wall and receives the echo pulses reflected by the opposite container wall. The echo sounding sensor is mounted by means of a clamping band placed round the container.

The problem underlying the invention is to provide a device of the type mentioned at the beginning which does not require any opening in the container wall.

According to the invention this is achieved in that the diaphragm is formed by a region of the container wall which is defined by a ring or frame which is attached to the outer side of the container and is in oscillatory mechanical connection with the container wall.

The invention is based on the recognition that a region of a container wall defined by a ring or frame of relatively large mass can perform the function of a diaphragm executing flexural oscillations. Of course, the area extent of the limited diaphragm region must be adequately large compared with the thickness of the container wall to enable the limited region to behave like a diaphragm. The defined region can then be set into oscillations like a diaphragm and the peripheral region in close contact with the ring or frame behaves as an almost fixed clamping of the diaphragm edge because it cannot oscillate due to the large mass of the ring or frame. Accordingly only a small proportion of the oscillatory energy is transmitted to the regions of the container wall lying outside the ring or frame.

Since a region of the container wall performs the function of the diaphragm it is not necessary to break through the container wall to mount a separate diaphragm. The apparatus according to the invention is therefore also suitable for uses in which a hole in the container wall is undesirable or even unallowed and it can also be mounted without any problems on already existing containers without having to empty them for that purpose. Furthermore, there are no sealing problems.

The device according to the invention is suitable for determining or monitoring the level both of liquid and of solid materials. When monitoring the level of liquids the defined diaphragm region is preferably stimulated to oscillations at a natural resonant frequency and the frequency and/or the phase of the oscillations is evaluated to detect the level. For the natural resonant frequency and the phase of the diaphragm region changes when it is contacted by the liquid because part of the adjoining liquid amount then also oscillates and the oscillating mass is therefore increased. The total frequency shift is caused not only by the amount of liquid also oscillating but also by viscous damping forces which are exerted by the liquid on the diaphragm region. In contrast, in the case of granular, pulverulent or other solid filling materials, the amplitude of the oscillations is evaluated to detect the level because such materials dampen the oscillations of the defined diaphragm region when they come into contact with the latter.

Advantageous embodiments and further developments of the device according to the invention are characterized in the subsidiary claims.

Figure 2:
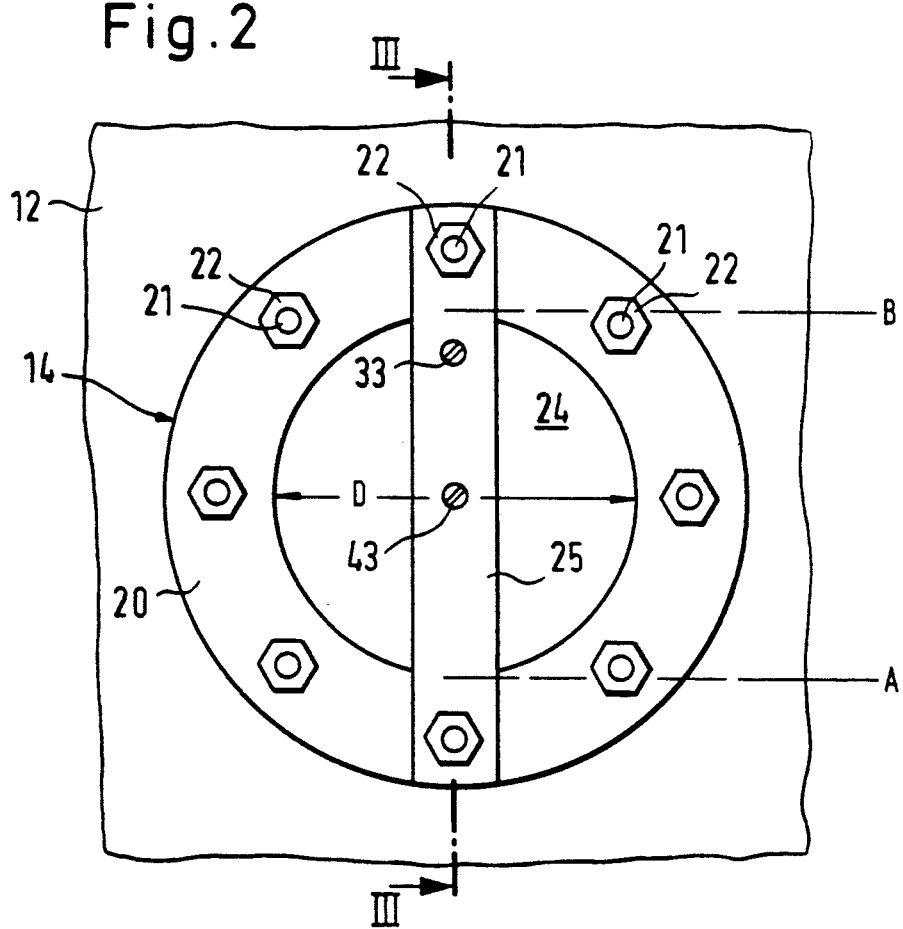
Figure 3:
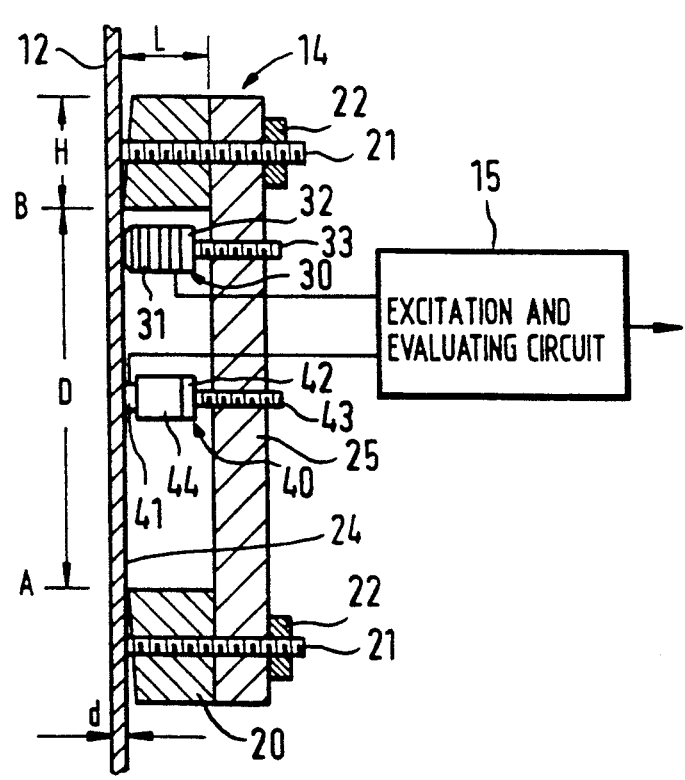
Figure 4:
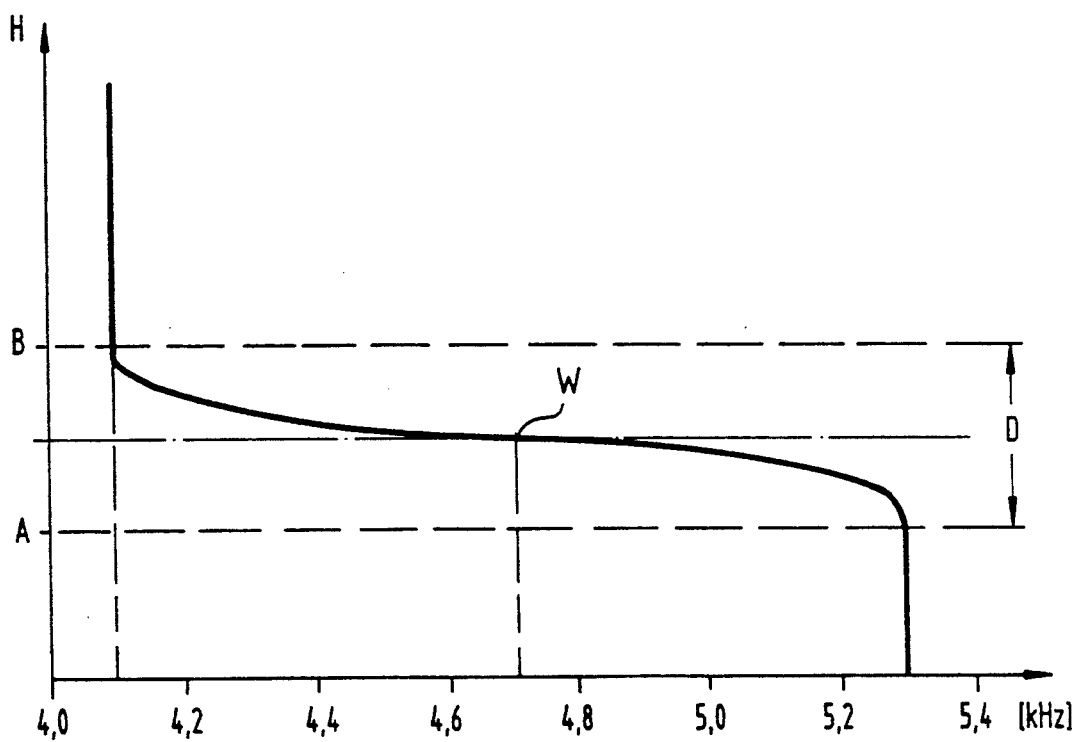
Figure 5:
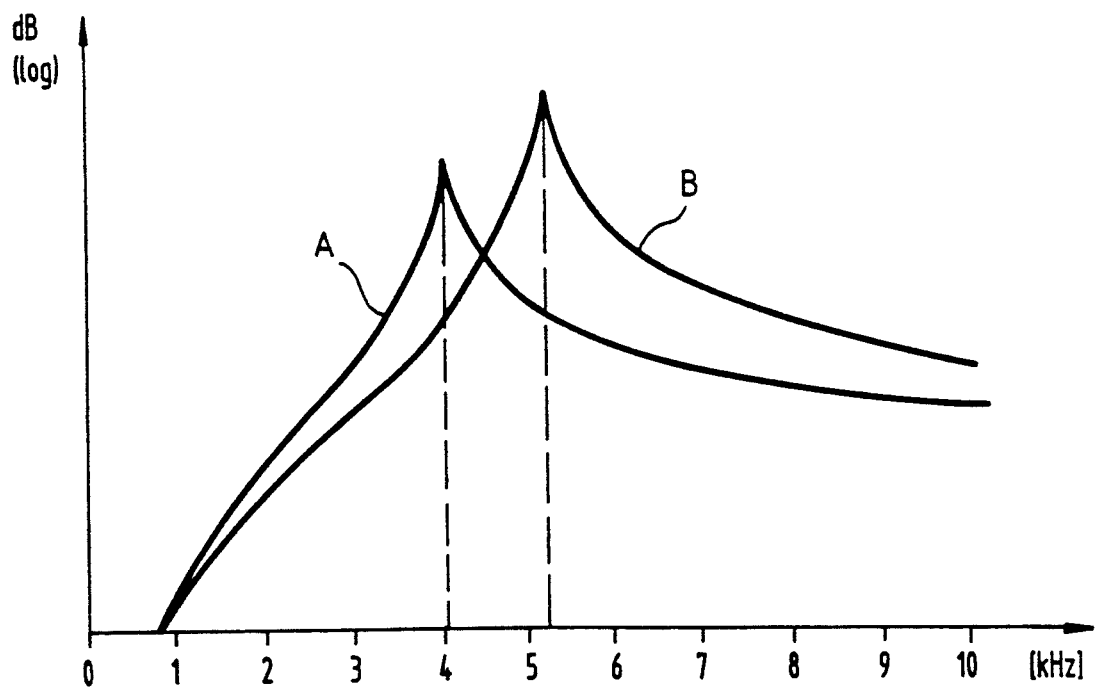
Figure 6:
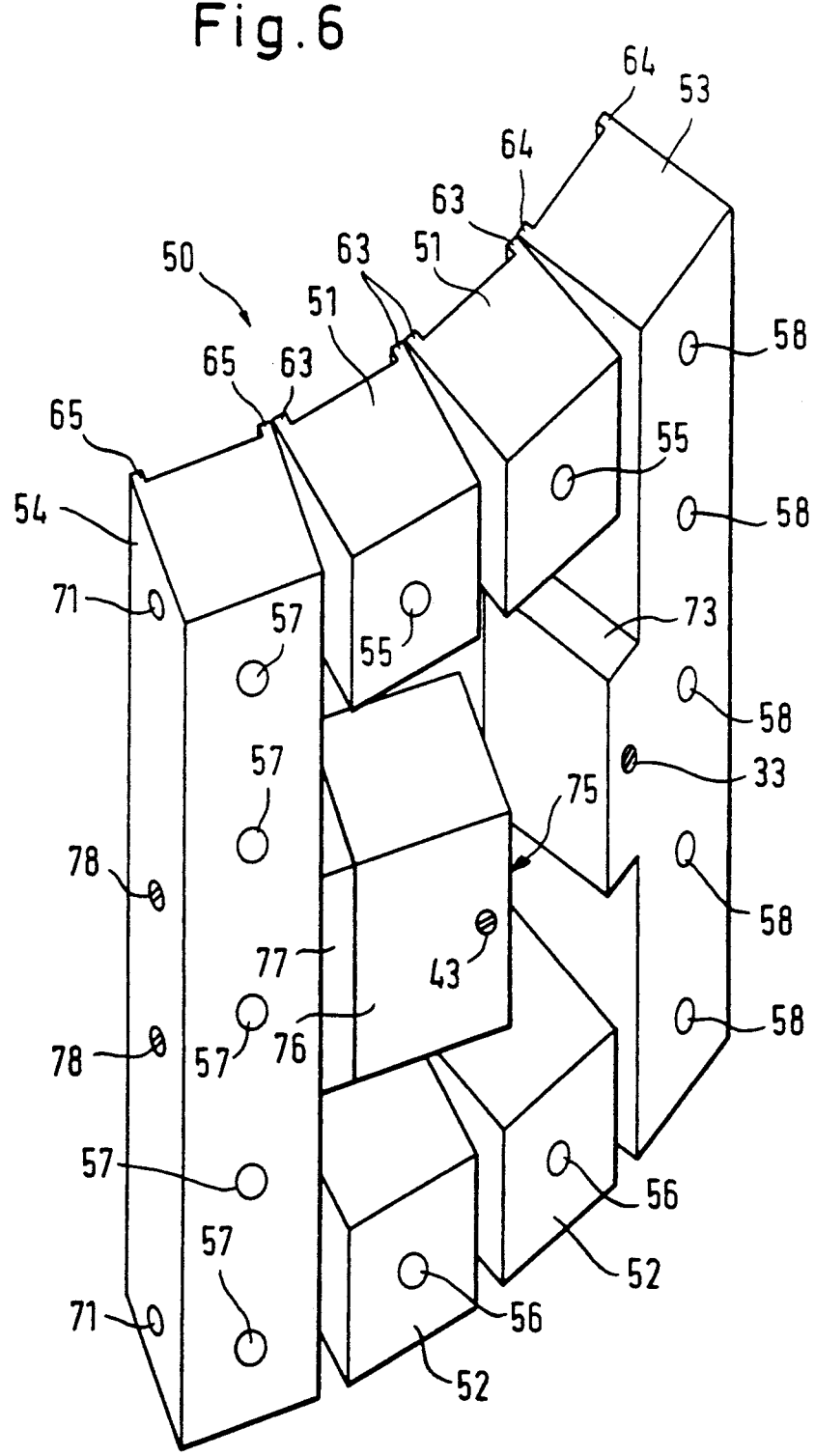
Figure 7:
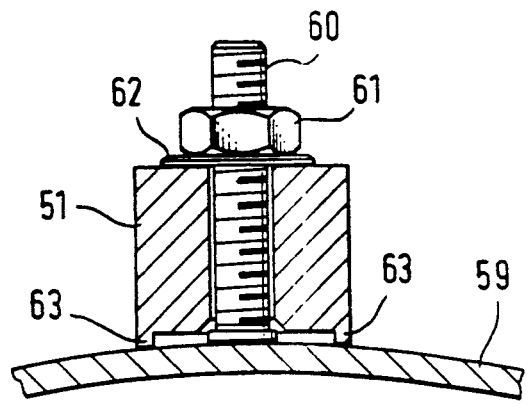
Figure 8:
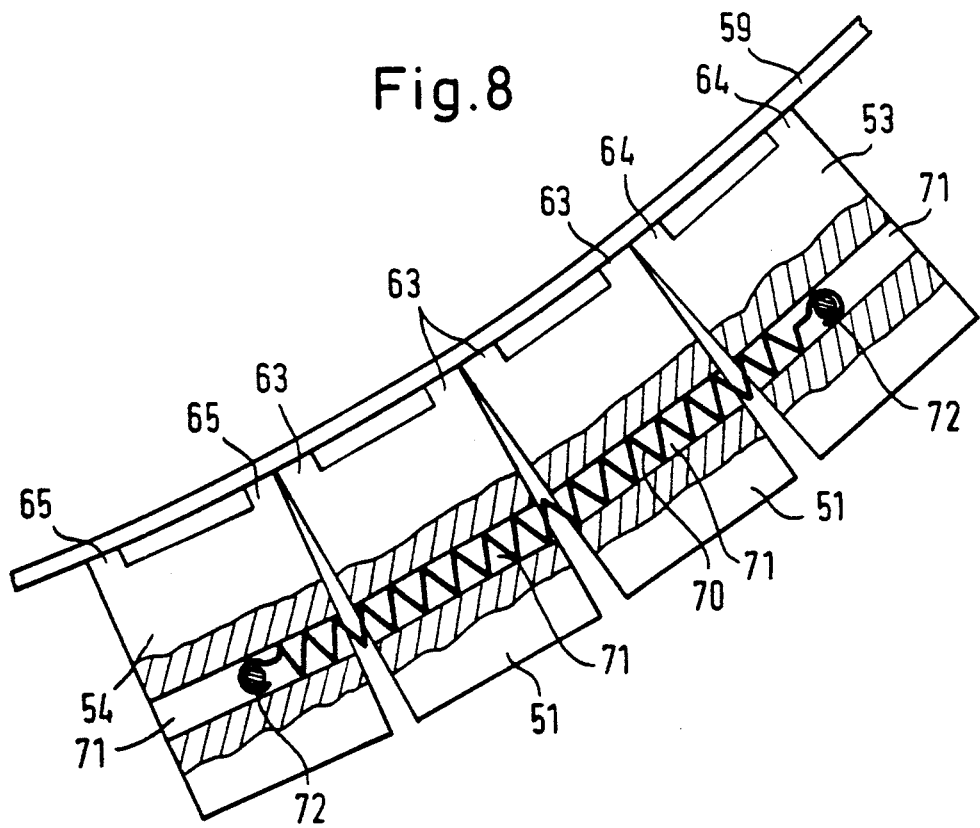
Figure 9:
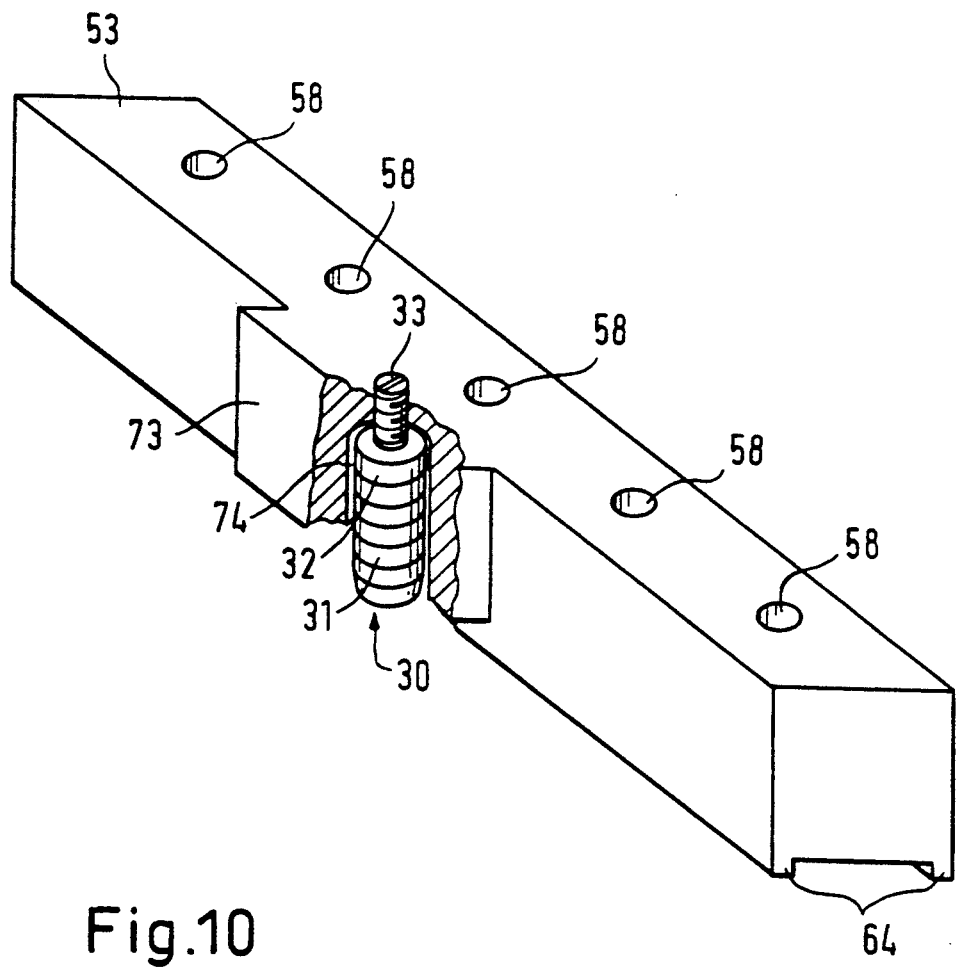
Figure 10:
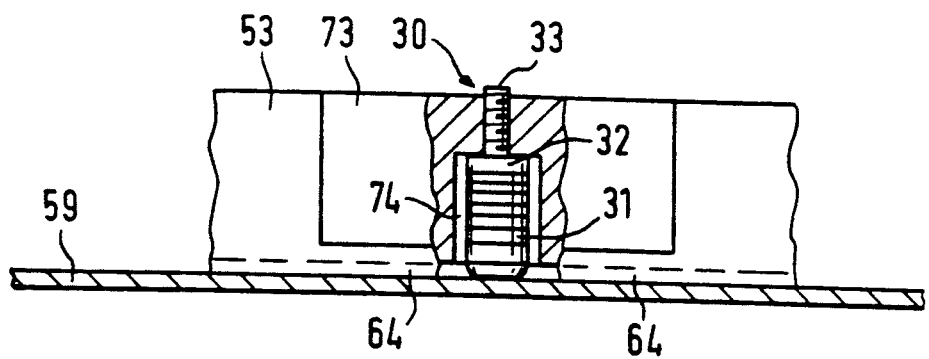
Figure 11:
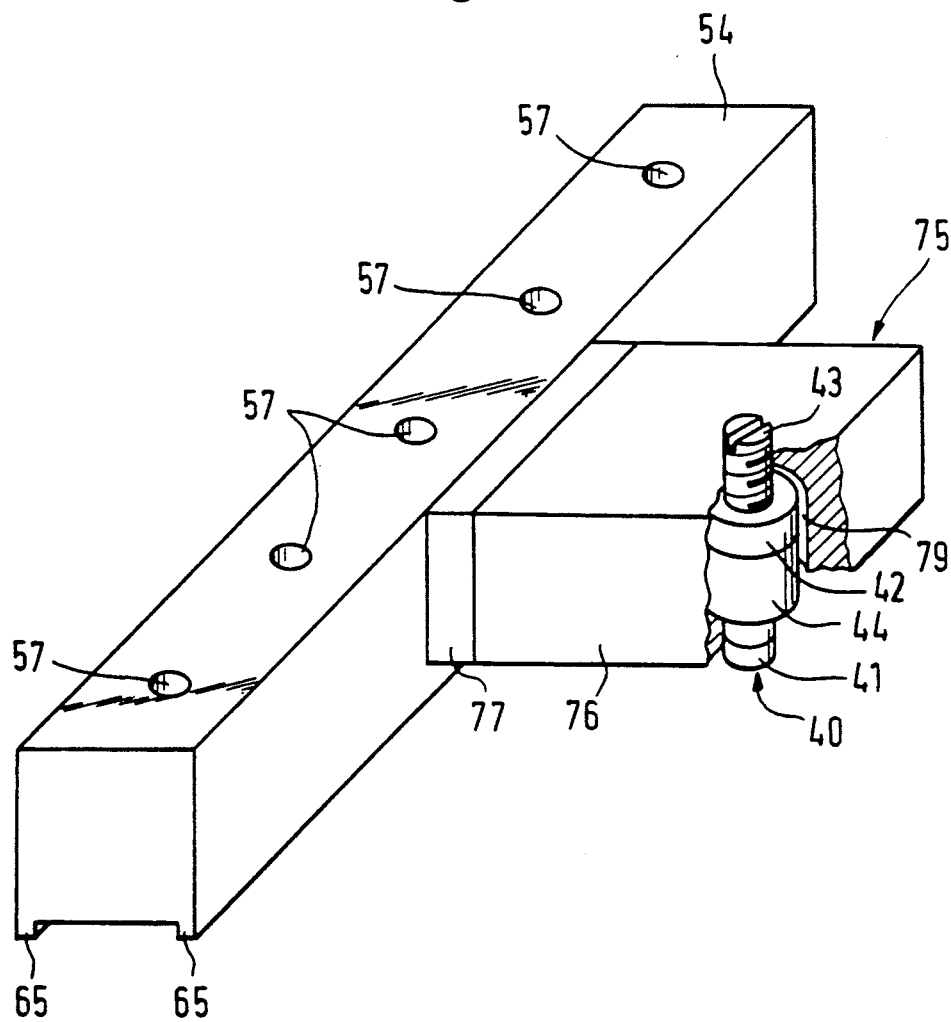

Further features and advantages of the invention will be apparent from the following description of examples of embodiment which are illustrated in the drawings, wherein:

FIG. 1 shows a container having two devices for determining and/or monitoring a maximum and a minimum contents level, FIG. 2 shows a plan view of the sensor of one of the two devices of FIG. 1, FIG. 3 is a section through the sensor of FIG. 2 along the line III—III of FIG. 2, FIG. 4 is a diagram showing the relationship between the level and the natural resonant frequency of the diaphragm region of the sensor of FIGS. 2 and 3, FIG. 5 shows the amplitude-frequency characteristics of the sensor of FIGS. 2 and 3 at two different levels in the container, FIG. 6 shows another embodiment of the sensor, FIG. 7 shows the mounting of part of the sensor of FIG. 6 on the container wall, FIG. 8 is a partially sectioned view of the upper frame portions of the sensor of FIG. 6, FIG. 9 is a partially cut-away perspective view of the one lateral frame strip of the sensor of FIG. 6, FIG. 10 is a partially cut-away front view of part of a frame strip of FIG. 9, FIG. 11 is a partially cut-away perspective view of the other lateral frame strip of the sensor of FIG. 6 and FIGS. 12 to 14 are graphical illustrations to explain the effect achieved with the sensor.

FIG. 1 shows a container 10 filled up to a height H with a liquid material 11. The height H of the material in the container 10 is the contents level. The level should not drop below a minimum value $H_{min}$ and not exceed a maximum value $H_{max}$. To monitor the maximum level a level sensor 14 is attached to the wall 12 of the container 10 at the height $H_{max}$ and is connected to an associated excitation and evaluating circuit 15, and to monitor the minimum level a level sensor 16 is attached to the container wall 12 at the height $H_{min}$ and is connected to an associated excitation and evaluating circuit 17. Each level sensor 14, 16 is so configured that it supplies to the associated excitation and evaluating circuit 15 and 17 respectively an electrical signal indicating whether or not the material contained in the container is at the level of the sensor.

The sensor 14 is shown in greater detail in FIGS. 2 and 3. The two sensors 14 and 16 are made completely identical. The following description of the sensor 14 therefore applies identically to the sensor 16 as well.

The peculiarity of these sensors is that they are arranged completely at the outer side of the container 10 and for their function do not require any opening in the container wall.

FIGS. 2 and 3 show a portion of the container wall 12 with a sensor 14 mounted thereon, it being assumed that the container wall 12 is planar. On the outer side of the container wall 12 a metal ring 20 is secured in forcelocking connection so that it is in oscillatory mechanical connection with the container wall 12. In the example illustrated the force-locking connection is established by attaching to the container wall 12 a plurality of threaded bolts 21 which project through bores in the metal ring 20. The threaded bolts 21 can be secured to the container wall 12 by spot welding or in another manner. The metal ring 20 is firmly pressed against the container wall 12 by nuts 22 screwed onto the threaded bolts 21. The metal ring 20 encloses and defines a circular region 24 of the container wall 12 and said region serves as diaphragm of the sensor.

To achieve a defined limitation of the diaphragm area on the container wall the end face of the metal ring 20 facing the container wall 12 is slightly outwardly bevelled so that the metal ring 20 bears on the container wall 12 only with the inner edge. This is shown exaggerated in FIG. 3 for clarity; the angle between the container wall 12 and the end side of the metal ring 20 is in reality very much smaller, for example of the order of magnitude of 0.1°.

To enable the diaphragm defined in this manner to be operated with an adequately low working frequency, the diameter of the defined region 24, i.e. the internal diameter of the metal ring 20, must be large compared with the thickness d of the container wall. For example, the working frequency may be about 5 kHz if with a container wall thickness d of 2.5 mm the diaphragm region 24 has a diameter D of about 60 mm.

A vertically diametrically extending bridge 25 is secured to the metal ring 20. The bridge 25 consists of a stiff metal member having a bore at each end. With these bores the bridge 25 is fitted onto two diametrically opposite threaded bolts 21 so that it is held firmly on the metal ring 20 by the nuts 22 screwed on to said threaded bolts 21.

Near the metal ring 20 and between the bridge 25 and the diaphragm region 24 an excitation transducer 30 is arranged which is able when excited by an electrical AC voltage to set the diaphragm region 24 in oscillation. As an example, it will be assumed that the excitation transducer 30 is formed by a stack of piezoelements 31 which is clamped between the diaphragm region 24 and a pressure plate 32. A grub screw 33 screwed into a threaded bore in the bridge 25 acts on the pressure plate 32 in order to obtain a certain biasing of the piezo stack on the diaphragm region. With the aid of the grub screw 33 the force with which the piezo stack is pressed against the diaphragm region 24 can be adjusted.

Each piezoelement 31 of the stack consists in known manner of a disc-shaped piezo crystal arranged between two electrodes. On application of an electrical voltage to the two electrodes the thickness of the piezo crystal varies in dependence upon the voltage. The piezoelements 31 are connected in parallel electrically so that on application of an electrical voltage their thicknesses vary in the same sense and they are connected mechanically in series so that their thickness changes summate. Thus, the axial length of the piezo stack changes in dependence upon the electrical voltage applied to the piezoelements 31. Since the piezo stack is held fixed at one end by the bridge 25 via the grub screw 33, the length changes of the piezo stack act on the diaphragm region 24 and the latter is correspondingly mechanically deformed. The oscillation amplitude of the diaphragm region is of the order of magnitude of a few pm, depending on the thickness d of the container wall.

In the centre of the diaphragm region 24 between the bridge 25 and said region 24 a receiving transducer 40 is arranged which responds to mechanical oscillations of the diaphragm region and converts them to an electrical voltage. By way of example it will be assumed that the receiving transducer 40 is constructed in the same manner as the excitation transducer 30 as a piezoelectric transducer. However, in contrast to the excitation transducer 30 a dingle piezoelement 41 suffices for the receiving transducer 40. A cylindrical siliccine composition 44 is interposed between the piezoelement 41 and a pressure plate 42 on which a grub screw 43 acts. The grub screw 43 is screwed into a threaded bore in the bridge 25 and via the pressure plate 42 and the silicone composition 44 exerts a force on the piezoelement 41 by which the latter is held in engagement with the diaphragm region 24. The silicone composition 44 acts here as elastic spring element. The use of a silicone composition instead of a metallic pressure spring, for example a helical spring, is found to be advantageous because the silicone composition has a nonlinear progressively rising spring characteristic and a certain internal damping.

The excitation transducer 30 is connected to an output of the excitation and evaluating circuit 15 and the receiving transducer 40 is connected to an input of the excitation and evaluating circuit 15. The excitation and evaluating circuit applies to the excitation transducer 30 a voltage which results in the excitation transducer 30 exerting on the portion of the diaphragm region 24 contacted thereby alternating forces which are directed perpendicularly to the plane of the diaphragm region. This sets the diaphragm region into flexural oscillations. Due to the flexural oscillations forces are exerted on the receiving transducer 40 arranged in the centre and are converted thereby to an electrical AC voltage which is supplied to the excitation and evaluating circuit 15.

The arrangement of the receiving transducer 40 in the centre of the diaphragm region 24 is best because the flexural oscillation amplitude there for the fundamental oscillation mode is greatest whilst the flexural oscillation amplitude for all even higher oscillation modes is substantially zero. The arrangement of the receiving transducer 40 at this point thus gives the greatest sensitivity for the fundamental oscillation modes whilst the other modes are substantially suppressed. On the other hand, the arrangement of the excitation transducer 30 in the edge region is best because there only small oscillation amplitudes occur. This permits the rigid biasing of the excitation transducer 30 necessary for the oscillation stimulation.

If the material contained in the container is a liquid, the natural resonant frequency of the diaphragm region depends on whether or not the diaphragm region 24 is covered by the liquid on the inner side of the container wall 12. Whereas when the diaphragm region is not covered the oscillating mass depends solely on the mass of the diaphragm region, when the latter is covered part of the adjoining liquid mass participates in the oscillation. The mass of the oscillating system is therefore greater when the diaphragm region is covered and accordingly the natural resonant frequency is lower. An additional damping due to the viscosity of the material increases the frequency change.

The diagram of FIG. 4 shows the relationship between the level in the container and the natural resonant frequency of the diaphragm region 24. The level is plotted along the ordinate because this corresponds to the spatial conditions, since the level is measured in the vertical direction. The point A corresponds to the lowest point of the diaphragm region 24 and the point B to the highest point of said region. The distance between the points A and B corresponds to the diameter D of the diaphragm region. The points A and B are also denoted in the same manner in FIGS. 2 and 3.

The frequencies indicated in the diagram of FIG. 4 correspond to a practical example of embodiment with the dimensions indicated above, i.e. a container wall thickness d of 2.5 mm and a diameter D of the diaphragm region of 60 mm. When the level in the container 10 lies above the highest point B of the diaphragm region 24 the latter has a natural resonant frequency of about 4.1 kHz which does not further change in dependence upon the level. When the level in the container 10 lies beneath the lowest point A of the diaphragm region 24 the latter has a natural resonant frequency of about 5.3 kHz which likewise does not further change in dependence upon the level. Between these two frequency values there is a considerable frequency difference of about 1.2 kHz which shows very clearly whether the level in the container 10 is above or below the diaphragm region of the sensor.

When the level is disposed between the two points A and B, i.e. the diaphragm region 24 is partially covered by the contents material, the natural resonant frequency depends very much on the degree of covering. If for example the level is reduced from a point lying above the highest point B, after dropping below the point B the natural resonant frequency does not initially change very much for as long as the level still lies in the upper edge zone of the diaphragm region. In contrast, in the centre zone of the diaphragm region 24 a rapid change of the natural resonant frequency occurs, the frequency curve having an inflection point W substantially in the centre of the membrane region. In the lower edge zone of the membrane region the natural resonant frequency reaches almost the value corresponding to the uncovered diaphragm so that it then further changes very little. The same frequency profile is of course obtained in the reverse direction when the level is increased gradually from a point lying beneath the diaphragm region 24.

The diagram of FIG. 5 shows the oscillation amplitude determined by the receiving transducer 40 when the frequency of the AC voltage applied to the excitation transducer 30 is varied in the range from 0 to 10 kHz. The curve A corresponds to the case where the level in the container 10 is above the sensor 14 so that the diaphragm region 24 is completely covered by the contents material whilst the curve B corresponds to the case where the level in the container 10 is below the sensor 14, i.e. the latter is not contacted by the material. The curve A has a pronounced maximum at the frequency of about 4.1 kHz corresponding to the natural resonant frequency with the diaphragm region 24 covered, and the curve B has a pronounced maximum at the frequency of about 5.3 kHz corresponding to the natural resonant frequency when the diaphragm region 24 is uncovered. When the diaphragm region 24 is partially covered the maximum of the curve lies between these two frequency values at a point which is apparent for each level from the diagram of FIG. 4.

On the basis of his expert knowledge, the diagrams of FIGS. 4 and 5 provide the average person skilled in the art with various possibilities for the configuration of the excitation and evaluating circuit 15. For example, the AC voltage source contained in the excitation and evaluating circuit may be so configured that the frequency of the AC voltage applied to the excitation transducer 30 changes periodically in a range containing all the resonant frequencies occurring. The excitation and evaluating circuit 15 then further contains a peak value detector which detects the maximum of the output signal of the receiving transducer 40, and a frequency discriminator determining at which frequency of the excitation AC voltage this maximum occurs. The corresponding level can then be allocated to the frequency determined using the diagram of FIG. 4, which has previously been plotted for the particular level sensor and stored for example in the form of a table.

Another configuration of the excitation and evaluating circuit 15 resides in that the frequency of the excitation AC voltage is always kept equal to the resonant frequency of the diaphragm region 24. This can be done in a generally known manner in that the receiving transducer 40 is connected to the excitation transducer 30 via an amplifier in a feedback self-excitation circuit. In this case the automatically arising self-excitation frequency need only be determined by a frequency discriminator contained in the excitation and evaluating circuit 15.

Furthermore, the excitation and evaluating circuit 15 may also be configured in such a manner that the excitation of the excitation transducer 30 is effected by direct current pulses. As is known, a direct current pulse contains a frequency spectrum having an extent which depends on the pulse width. If the pulse width is so dimensioned that the resonant frequencies of the diaphragm region 24 occurring are contained in the frequency spectrum, the diaphragm region 24 is stimulated to flexural oscillations at its resonant frequency. The output signal of the receiving transducer 40 after every excitation pulse is then a decaying wave train having a frequency which corresponds to the resonant frequency and which once again can be determined by a frequency discriminator.

The sensor described also permits another evaluation of the level-dependent change of the natural resonant frequency indicating with good accuracy and without calibration whether the level rises above or drops below the centre of the diaphragm during filling or emptying of the container. For this purpose the previously mentioned fact that the frequency curve of FIG. 4 has the inflection point W at a certain point of the diaphragm region is utilized. By determining the inflection point it is therefore possible to determine without calibration when the level has reached this point of the diaphragm region.

Instead of this frequency, the phase difference between the output signal of the receiving transducer 40 and the excitation AC voltage supplied to the excitation transducer 30 can also be determined and evaluated to find the level because this phase difference clearly changes in the same manner as the frequency in dependence upon the level. The excitation and evaluating circuit 15 then contains a phase discriminator instead of a frequency discriminator.

Irrespective of the nature of the generation of the flexural oscillations by the excitation transducer 30 and of the evaluation of the output signal of the receiving transducer 40, a substantial advantage of the level sensor described resides in that it is possible to detect not only whether the level is above or below the diaphragm region 24 but even with good accuracy at which point within the diaphragm region the level is located. The detection region is thereby substantially narrower than the region corresponding to the diaphragm diameter and accordingly it is possible to detect with correspondingly greater accuracy whether or not the predetermined level is reached.

It is not necessary for the defined diaphragm region to be circular; it may also have other shapes, for example be square or rectangular. Instead of the circular metal ring 20 of FIGS. 2 and 3 a metal frame with the desired outline is then secured to the container wall. Furthermore, the sensor described is suitable not only for planar container walls but also for curved container walls; the metal ring or metal frame must then of course be shaped so that it is in oscillatory mechanical connection with the container wall at all points. Finally, the metal ring or metal frame also need not necessarily be a one-piece or gaplessly assembled body. It may also consist of a plurality of individual parts which are mounted separately and/or with gaps on the container wall.

In FIGS. 6 to 11 an example of embodiment of the sensor is illustrated which combines the previously described modifications. In this example of embodiment to delineate the diaphragm region a rectangular frame 50 is employed which is so configured that it can be mounted selectively on planar container walls or on cylindrical container walls of different curvature. For this purpose the upper and lower horizontal frame strips are divided into segments 51 and 52 whilst the two lateral vertical frame strips 53 and 54 are made in one piece. In each segment 51 and 52 a bore 55 and 56, respectively, is formed for the passage of a threaded bolt and each lateral frame strip 53, 54 contains several such bores 57 and 58,, respectively.

FIG. 7 shows how one of the segments 51 is secured to a curved container wall 59 with the aid of a threaded bolt 60 and a nut 61 screwed onto the threaded bolt 60 with interposition of a washer 62. The threaded bolt 60 is preferably secured to the container wall 59 by electrical spot welding in such a manner that it is exactly perpendicular to the container wall. The segment 51 is provided along the edges running parallel to the generatrices of the container 59 with foot strips 63 which bear on the container wall 59 whilst the portion of the segment 51 lying between the foot strips 63 is spaced from the container wall 59. As a result, in spite of the curvature of the container wall 59 an exactly defined bearing of the segment 51 on the container wall is achieved. All the segments 51 and 52 are made and mounted in identical manner. As shown in FIG. 6, the lateral frame strips 53 and 54 along the vertical edges are also provided with foot strips 64 and 65 bearing on the container wall along the generatrices. These lateral frame strips are likewise secured to the container wall in the manner described above by means of threaded bolts projecting through the bores 57 and 58.

The components of the frame 60 are held on the threaded bolts before assembly by tension springs as can be seen in the partially sectioned view of FIG. 8 for the segments 51 and the lateral frame strips 53, 54. A tension spring 70 is arranged in bores 71 which are formed in the segments 51 and the frame strips 53, 54 in such a manner that they are in coaxial alignment when the parts lie flatly against each other with their opposing faces. The bores 71 lie of course outside the plane of the bores which are intended to receive the threaded bolts. The two ends of the tension spring 70 are anchored with pretensioning of the tension springs to pins 72 which are arranged in the frame strips 53 and 54 and pass transversely through the bores 71. A further tension spring is arranged in the same manner in bores in the segments 52 and in corresponding bores in the lateral frame strips 53 and 54. Due to their pretensioning the two tension springs hold the parts of the frame 50 in engagement with each other so that the frame is flat as long as it is not mounted on the threaded bolts. The tension springs permit the expansion of the frame necessary to push the frame members with their bores onto the threaded bolts which are mounted corresponding to the perforation grid dimensions and project radially from the container wall.

In the centre of the lateral frame strip 53 on the inner side a projection 73 is integrally formed and serves to receive the excitation transducer. As shown by FIGS. 9 and 10, the excitation transducer has the same construction as the excitation transducer 30 of FIG. 3 and for this reason its components are designated by the same reference numerals as in said Figure. The piezo stack 31 is arranged in a recess 74 of the projection 73 between the container wall 59 and the pressure plate 32 and by the grub screw 33 which is screwed into a threaded bore in the projection 73 and acts on the pressure plate 32 is pressed with adjustable application force against the container wall 59. As apparent from FIG. 10, the foot strip 64 is interrupted at the inner side of the frame strip 53 in the region of the recess 74.

On the opposite frame strip 54 a cantilever member 75 is disposed which extends beyond the centre of the spacing between the two frame strips 53 and 54 and serves to receive the receiving transducer. The cantilever member 75 consists of a metal block 76 which is screwed by means of screws 78 to the lateral frame strip 54 with interposition of a decoupling plate 77. Said decoupling plate 77 consists of a material which dampens the transmission of vibrations between the frame strip 54 and the metal block 76, for example of rubber. As shown in FIG. 11, the receiving transducer has the same structure as the receiving transducer 40 of FIG. 3 and for this reason its components are denoted by the same reference numerals as in that Figure. The piezoelement 41 is arranged together with the silicone composition 44 and the pressure plate 42 in a recess 79 of the metal block 76. The grub screw 43 which is screwed into a threaded bore in the metal block 76 and acts on the pressure plate 42 holds the piezoelement 41 in engagement with the container wall with adjustable application force. The recess 79 is formed in the metal block 76 in such a manner that the receiving transducer 40 bears on the container wall in the centre of the region enclosed by the frame 50.

As in the embodiment of FIGS. 2 and 3, in the embodiment of FIGS. 6 to 11 as well the region for the container wall enclosed by the frame 50 forms the diaphragm of the sensor. The sensor of FIGS. 6 to 11 has the same mode of operation as the sensor of FIGS. 2 and 3 and exhibits the same behaviour as represented by the diagrams of FIGS. 4 and 5. The stimulation of the flexural oscillations of the diaphragm region by the excitation transducer 30 and the evaluation of the output signals of the receiving transducer 40 can therefore take place in the same manner as previously described for the sensor of FIGS. 2 and 3.

Figure 12:
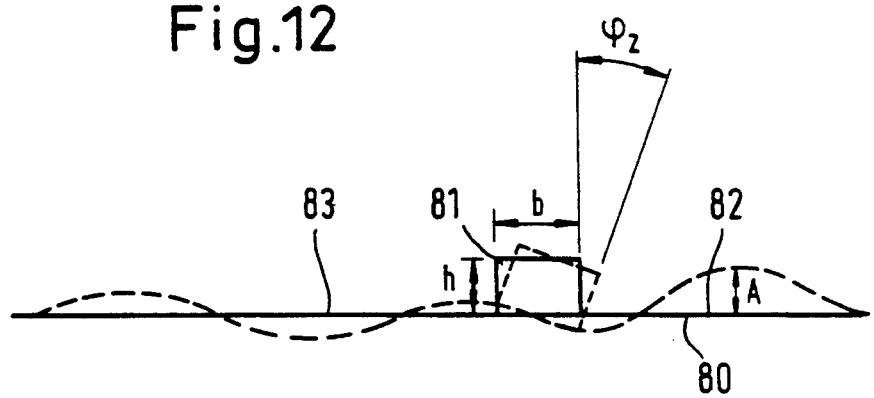
Figure 13:
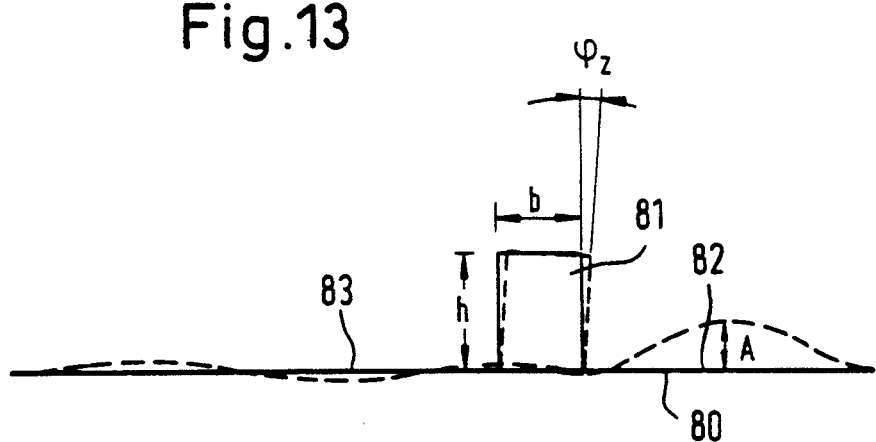
Figure 14:
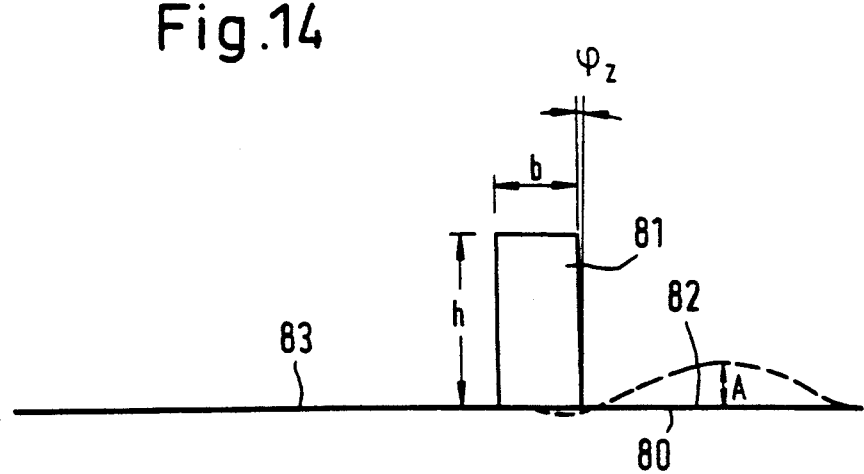

The formation of the diaphragm of the sensor by a region of the container wall defined by a ring or frame in oscillatory mechanical connection with the container wall is based in all the examples of embodiment illustrated on the fact that the transmission of the flexural oscillations of the diaphragm region into the portion of the container wall lying outside the ring or frame is suppressed by the mass of the ring or frame. This is illustrated by FIGS. 12 to 14 in which the calculated results for various masses of the ring or frame are shown graphically. Each of these Figures shows a section through a planar container wall 80 which is represented in the rest state by a straight line, and the cross-section of a ring or frame member 81 which is mounted on the container wall 80 in such a manner that it is in oscillatory mechanical connection with the container wall. The portion 82 of the container wall lying to the right of the ring or frame member 81 forms the diaphragm region which is set in flexural oscillations. For clarity, the amplitudes of the flexural oscillations are shown greatly exaggerated in all the Figures. The calculations in all three Figures are for the same container wall with a thickness of 2.5 mm and for the same amplitude A of the flexural oscillations of the diaphragm region but were carried out for different cross-sections of the ring or frame member 81.

FIG. 12 shows the results for a ring or frame member 81 having a width b of 30 mm and a height h of 20 mm. As can be seen, the flexural oscillations of the diaphragm region 82 are transmitted with relatively little attenuation to the wall region 83 lying outside the diaphragm region 82. As indicated in FIG. 12 in dashed line, the ring or frame member 81 is deflected at a considerable angle $\phi_Z$ due to the oscillatory mechanical connection. Because of the amplitude exaggeration this angle is of course also shown exaggerated in magnitude.

FIG. 13 shows the relationships for a cross-section of the ring or frame member 81 with the same width b of 30 mm but with twice the height h of 40 mm. The cross-section is thus twice as large as in the case of FIG. 12 and accordingly the ring or frame has twice the mass. Due to its greater mass the ring or frame member 81 is now only deflected through a relatively small angle $\phi_z$, the transmission of the flexural oscillations of the diaphragm region 82 to the wall region 83 thereby being greatly attenuated.

Finally, FIG. 14 shows the relationships for a cross-section of the ring or frame member with the same width b of 30 mm but three times the height h of 60 mm. Accordingly, the ring or frame has three times the mass as in the case of FIG. 12. In this case the angle $\phi_z$ by which the ring or frame member 81 is deflected is negligibly small and the transmission of the flexural oscillations of the diaphragm region 82 to the wall region 83 is practically completely suppressed. In the case of FIG. 14 the diaphragm region 82 thus fulfills the function of a sensor diaphragm in perfect manner. A further increase of the mass of the ring or frame would then not result in any appreciable further improvement.

A practicable diaphragm effect is achieved if the mass of the ring or frame is greater than the mass of the region of the container wall lying inside the ring or frame.

The invention is of course not restricted to the examples of embodiment described above. In particular, instead of piezoelectric transducers any desired other electromechanical transducers may be used which are able to set the defined diaphragm region on application of an electrical voltage in mechanical oscillations and sense the mechanical oscillations of the diaphragm region and convert them to an electrical signal. Also suitable for this purpose for example are electromagnetic or magnetostrictive transducers. The transducers may be mounted in any desired suitable manner in order to have the necessary interaction with the diaphragm region.

The metal ring or metal frame may also be secured to the container wall in a manner other than by threaded bolts and nuts, for example by welding, adhesion or the like. Fundamentally, any type of mounting is suitable which ensures an oscillatory mechanical connection of the metal ring or metal frame to the container wall. The securing by means of threaded bolts has the advantage that when necessary the entire sensor can easily be removed from the container wall.

The detection of the level described above by evaluating the natural resonant frequency of the diaphragm region is suitable only for liquid contents because it is only with the latter that an appreciable change of the natural resonant frequency occurs in dependence upon the degree of covering of the diaphragm region. However, without modifying its mechanical structure the sensor described can be used to monitor the level of solid materials, for example granular or pulverulent materials, in that instead of the natural resonant frequency the damping of the oscillation amplitude of the diaphragm region is evaluated. It is only necessary here to modify the excitation and evaluating circuit. This modification will be obvious to the average person skilled in the art on the basis of his expert knowledge because for other level sensors as well which are optionally applicable to liquid or solid materials corresponding different excitation and evaluating circuits are known. For example, the evaluating circuit can be modified so that instead of a frequency or phase discriminator an amplitude discriminator is provided, the output signal of which indicates whether the amplitude of the output signal of the receiving transducer lies above or below a set amplitude threshold value. The amplitude threshold value is set so that it is greater than the amplitude of the output signal with the diaphragm region covered and smaller than the amplitude of the output signal with the diaphragm region uncovered.

I claim:

1. A device for determining and/or monitoring a predetermined contents level in a container comprising a sensor which is mounted at the height of the predetermined level and comprises a diaphragm which comes into contact with the filling material when the latter reaches or exceeds the predetermined level in the container, and an electromechanical excitation transducer which when fed with an electrical voltage sets the diaphragm in oscillations, and an electromechanical receiving transducer which converts the oscillations of the diaphragm into an electrical AC voltage, and an evaluating circuit for initiating display and/or switching operations in dependence upon the frequency, the phase or the amplitude of the AC voltage emitted by the receiving transducer, the diaphragm being formed by a region of the container wall which is defined by a ring which is attached to the outer side of the container and is in oscillatory mechanical connection with the container wall, the ring being divided into segments which are held together by tension springs which extend through bores in the segments and are anchored at both ends to frame members.

2. A device for determining and/or monitoring a predetermined contents level in a container comprising a sensor which is mounted at the height of the predetermined level and comprises a diaphragm which comes into contact with the filling material when the latter reaches or exceeds the predetermined level in the container, the diaphragm being formed by a region of a wall of the container which is defined by a ring or frame which is attached to the outer side of the container and is in oscillatory mechanical connection with the container wall, and an electromechanical excitation transducer which when fed with an electrical voltage sets the diaphragm in oscillations, the excitation transducer being formed by a stack of piezoelectric elements which is clamped between the container wall and a support member fixedly connected to the ring or frame, and an electromechanical receiving transducer which converts the oscillations of the diaphragm into an electrical AC voltage, and an evaluating circuit for initiating display and/or switching operations in dependence upon the frequency, the phase or the amplitude of the AC voltage emitted by the receiving transducer.

3. Device according to claim 2 comprising an adjustment member arranged between the support member and the piezo stack for adjusting the force with which the piezo stack is pressed against the container wall.

4. Device according to claim 3 wherein the adjustment member is a grub screw screwed into a threaded bore in the support member.

5. Device according to claim 2 wherein the support member is a stiff bridge extending transversely across the ring or frame.

6. A device for determining and/or monitoring a predetermined contents level in a container comprising a sensor which is mounted at the height of the predetermined level and comprises a diaphragm which comes into contact with the filling material when the latter reaches or exceeds the predetermined level in the container, the diaphragm being formed by a region of a wall of the container which is defined by a ring or frame which is attached to the outer side of the container and is in oscillatory mechanical connection with the container wall, and an electromechanical excitation transducer which when fed with an electrical voltage sets the diaphragm in oscillations, and an electromechanical receiving transducer which converts the oscillations of the diaphragm into an electrical AC voltage, the receiving transducer being formed by at least one piezoelectric element which is clamped between the container wall and a support member fixedly connected to the ring or frame, and an evaluating circuit for initiating display and/or switching operations in dependence upon the frequency, the phase or the amplitude of the AC voltage emitted by the receiving transducer.

7. Device according to claim 6 wherein between the piezoelectric element and the support member an elastic spring element is inserted.

8. Device according to claim 7 wherein the elastic spring element is a silicone composition.

9. Device according to claim 7 comprising an adjustment member arranged between the support member and the spring element for adjusting the force with which the piezoelectric element is held in engagement with the container wall.

10. Device according to claim 9 wherein the adjustment member is a grub screw screwed into a threaded bore in the support member.

11. Device according to claim 6 wherein the support member is a stiff bridge extending transversely over the ring or frame.

12. Device according to claim 6 wherein the support member is a cantilever member which is formed on a ring or frame member and extends beyond the centre of the defined diaphragm region.

13. Device according to claim 12 wherein the cantilever member comprises a metal block and a decoupling member arranged between the metal block and the ring or frame member.

14. Device according to claim 13 wherein the decoupling member is a rubber plate.

15. A device for determining and/or monitoring a predetermined contents level in a container comprising a sensor which is mounted at the height of the predetermined level and comprises a diaphragm which comes into contact with the filling material when the latter reaches or exceeds the predetermined level in the container, and an electromechanicl exitation transducer which when fed with an electrical voltage sets the diaphragm in oscillations, and an electromechanical receiving tranducer which converts the oscillations of the diaphragm into an electrical AC voltage, and an evaluating circuit for initiating display and/or switching operations in dependence upon the frequency, the phase or the amplitude of the AC voltage emitted by the receiving transducer, the diaphragm being formed by a region of the container wall which is defined by a frame which is attached to the outer side of the container and is in oscillatory mechanical connection with the container wall, the frame including an end face having an inner edge, the mass of the frame being greater than the mass of the defined region of the container wall, and the end face of the frame facing the container wall being outwardly bevelled so that the frame bears on the container wall only with the inner edge, the electromechanical exitation transducer being formed by a stack of piezoelectric elements clamped between the container wall and a support member coupled to the frame.

16. The device according to claim 15 wherein the angle between the end face of the frame and the container wall is in the order of 0.1 degree.

17. The device according to claim 15 wherein the frame is circular.

18. The device according to claim 15 wherein the frame is mounted on the container by means of threaded bolts secured to the container wall.

19. The device according to claim 18 wherein the threaded bolts are welded onto the container wall.

20. The device according to claim 15 wherein the excitation transducer is arranged at the edge and the receiving transducer in the center of the defined diaphragm region.

21. The device according to claim 15 comprising an adjustment member arranged between the support member and the piezo stack for adjusting the force with which the piezo stack is pressed against the container wall.

22. The device according to claim 21 wherein the adjustment member is a grub screw screwed into a threaded bore in the support member.

23. The device according to claim 15 wherein the support member is a stiff bridge extending transversely across the frame.

24. The device according to claim 15 wherein the receiving transducer is formed by at least one piezoelectric element which is clamped between the container wall and a support member fixedly connected to the frame.

25. The device according to claim 24 wherein between the piezoelectric element and the support member an elastic spring element is inserted.

26. The device according to claim 25 wherein the elastic spring element is a silicone composition.

27. The device according to claim 26 comprising an adjustment member arranged between the support member and the spring element for adjusting the force with which the piezoelectric element in held in engagement with the container wall.

28. The device according to claim 27 wherein the adjustment member is a grub screw screwed into a threaded bore in the support member.

29. The device according to claim 24 wherein the support member is a stiff bridge extending transversely across the frame.

30. A device for determining and/or monitoring a predetermined contents level in a container comprising a sensor which is mounted at the height of the predetermined level and comprises a diaphragm which comes into contact with the filling material when the latter reaches or exceeds the predetermined level in the container, and an electromechanical excitation transducer which when fed with an electrical voltage sets the diaphragm in oscillations, and an electromechanical receiving transducer which converts the oscillations of the diaphragm into an electrical AC voltage, and an evaluating circuit for initiating display and/or switching operations in dependence upon the frequency, the phase or the amplitude of the AC voltage emitted by the receiving transducer, the diaphragm being formed by a region of the container wall which is defined by a frame which is attached to the outer side of the container and is in oscillatory mechanical connection with the container wall, the mass of the frame being greater than the mass of the defined region of the container wall, wherein the frame is divided into segments provided along the edges with foot strips which bear on the container wall whilst the portion of each segment lying between the foot strips is spaced from the container wall, the segments being held together by tension springs which extend through bores in the segments and which are anchored at both ends to frame members.

31. The device according to claim 30 wherein in the case of a curved container wall the foot strips are provided along the edges of the segments running parallel to the generatrices of the container wall.

32. The device according to claim 30 wherein the excitation transducer is arranged at the edge and the receiving transducer in the center of the defined diaphragm region.

33. The device according to claim 30 wherein the excitation transducer is formed by a stack of piezoelectric elements which is clamped between the container wall and a support member fixedly connected to the frame.

34. The device according to claim 33 wherein the support member is a projection integrally formed on a segment of the frame.

35. The device according to claim 34 wherein the projection has a recess in which the piezo stack is arranged.

36. The device according to claim 30 wherein the receiving transducer is formed by at least one piezoelectric element which is clamped between the container wall and a support member fixedly connected to the frame.

37. The device according to claim 36 wherein between the piezoelectric element and the support member an elastic spring element is inserted.

38. The device according to claim 37 wherein the elastic spring element is a silicone composition.

39. The device according to claim 37 comprising an adjustment member arranged between the support member and the spring element for adjusting the force with which the piezoelectric element is held in engagement with the container wall.

40. The device according to claim 39 wherein the adjustment member is a grub screw screwed into a threaded bore in the support member.

41. The device according to claim 36 wherein the support member is a cantilever member which is fixedly connected to a frame member and extends beyond the center of the defined diaphragm region.

42. The device according to claim 41 wherein the cantilever member comprises a metal block and a decoupling member arranged between the metal block and the frame member.

43. The device according to claim 42 wherein the decoupling member is a rubber plate.

* * * * *